Patented May 19, 1936

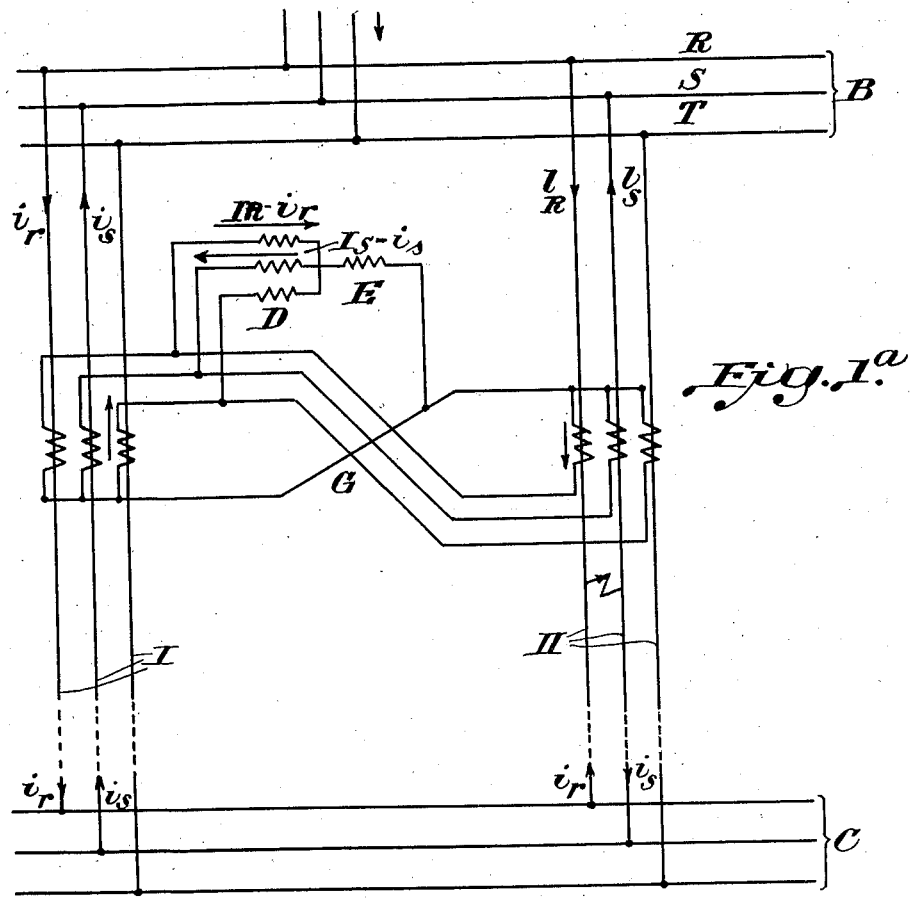
Fig.1^a
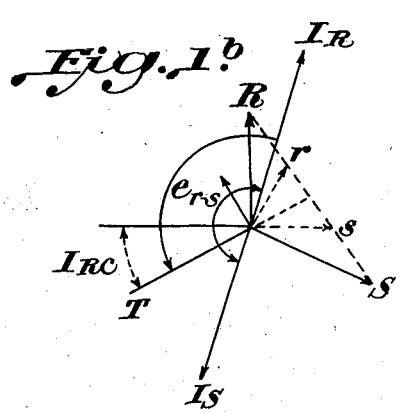
Fig.1^b
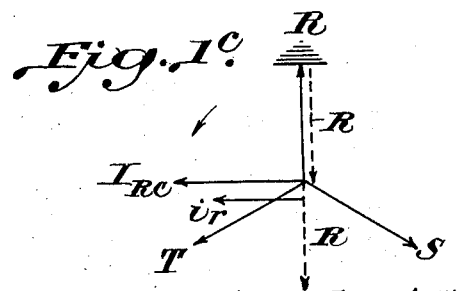
Fig.1^c

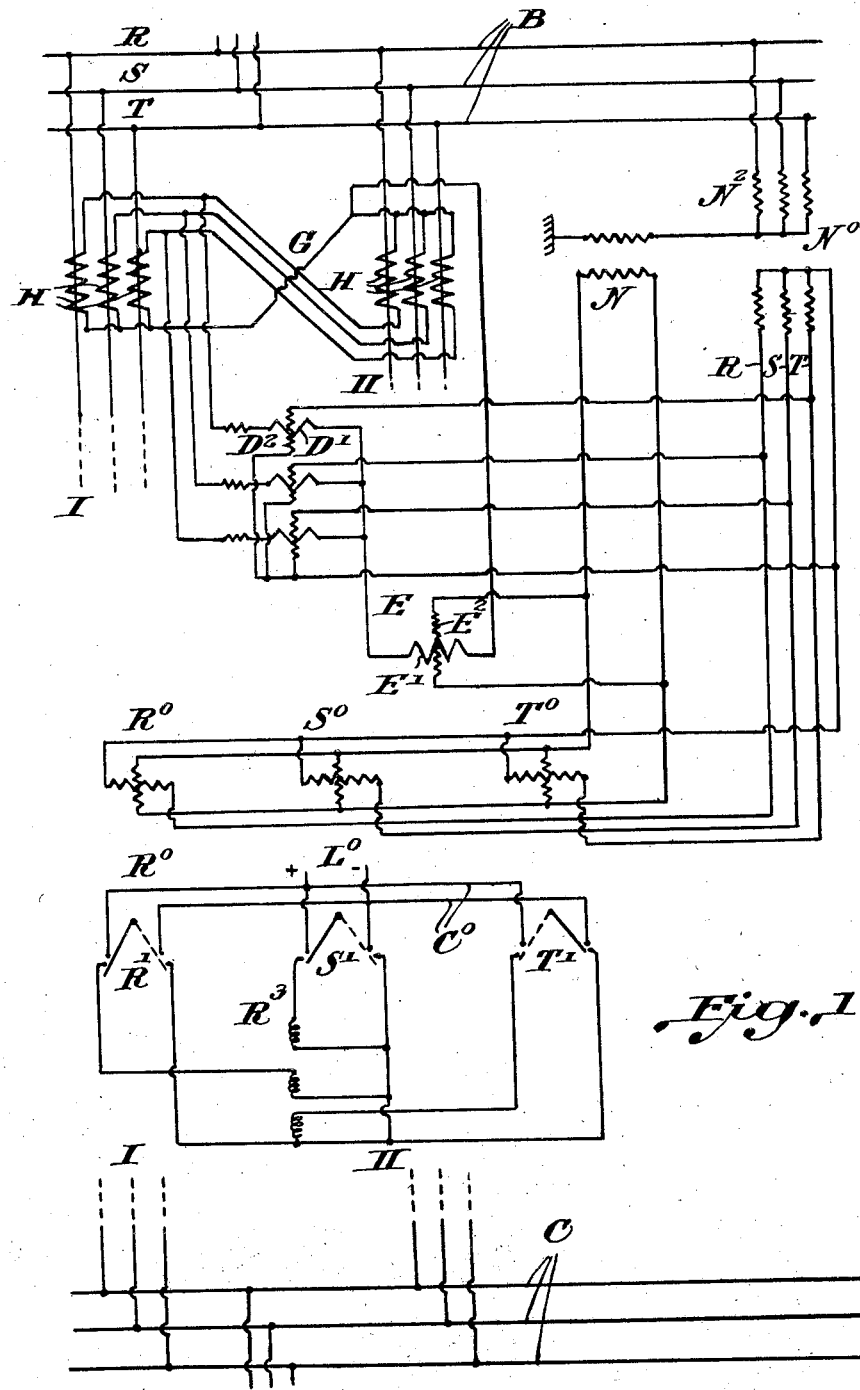

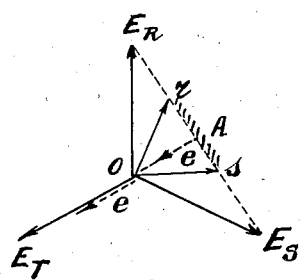
Fig.1e.
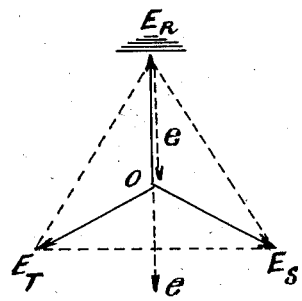
Fig.2.
Fig.3.
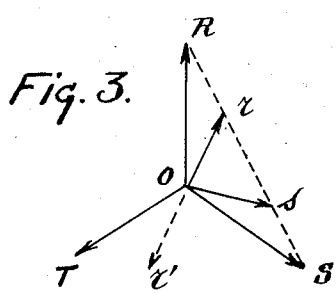
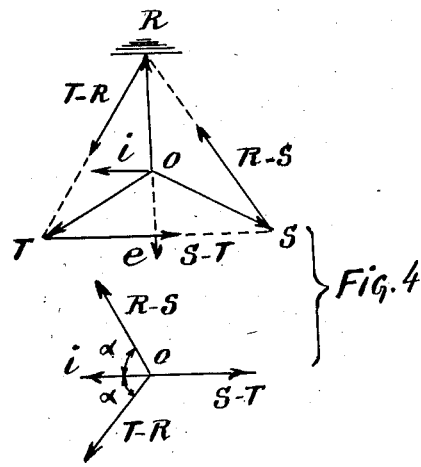
Fig.4
Fig.10
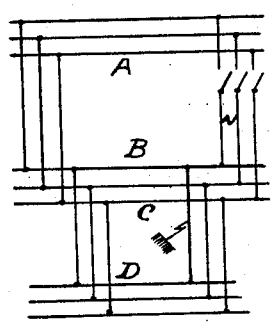
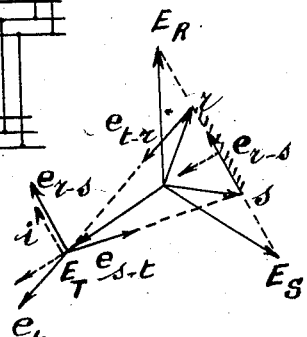
Fig.5
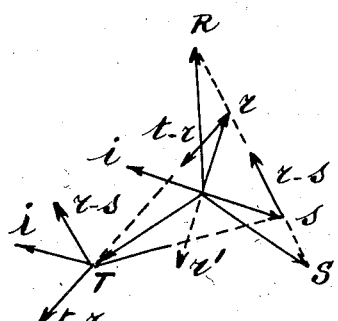
Fig.6

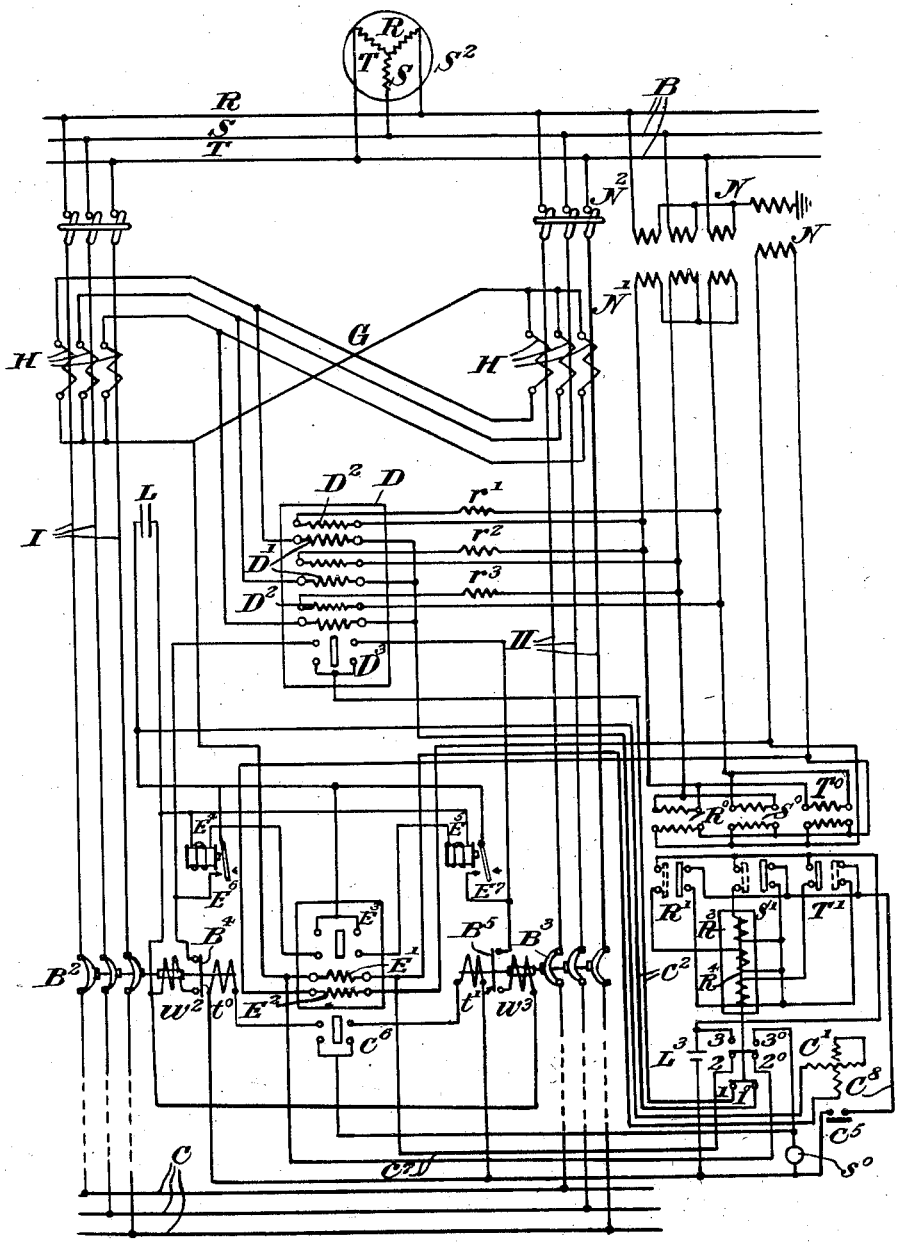
Fig. II.

2,041,644

UNITED STATES PATENT OFFICE 2,041,644

SELECTIVE PROTECTION OF ELECTRIC DISTRIBUTING NETWORKS HAVING AN INSULATED NEUTRAL POINT

André Jonnart, Charleroi, Belgium

Application May 29, 1930, Serial No. 457,368
In Belgium June 14, 1929

15 Claims. (Cl. 175—294)

The invention relates to the selective protection of electrical distributing networks, especially those networks with parallel lines and insulated neutral point and concerns particularly the arrangements of relays and apparatus associated to such lines for the purpose of isolating faults appearing on the network.

The object of the invention is to provide arrangements of relays and apparatus adapted to operate correctly under all distributing conditions occurring on such networks.

According to one feature of the invention at each end of a distributing section of a network of the kind indicated a group of relays is provided, such group mainly comprising a relay, called "directional relay", and adapted for isolating short circuit faults, and a relay, called "earth relay" and adapted for isolating earth faults, together with relays individually connected to the distribution phases and arranged so that their combined actions may be used to control the operations of the said directional and earth relays.

According to another feature of the invention the relays individually connected to the distribution phases are monophase wattmeter relays, adapted to be deflected in both directions and said monophase wattmeter relays are associated with secondary circuits and apparatus so arranged and combined with the directional and earth relays as to enable the operations of said latter relays to be effectively controlled.

Other features of the invention will more clearly appear from the following description with the aid of the accompanying drawings in which:

Figs. 1a to 6 are explanatory diagrams;

Fig. 10 is an explanatory diagram;

Fig. 11 shows a further modification of Fig. 8;

Figure 1:
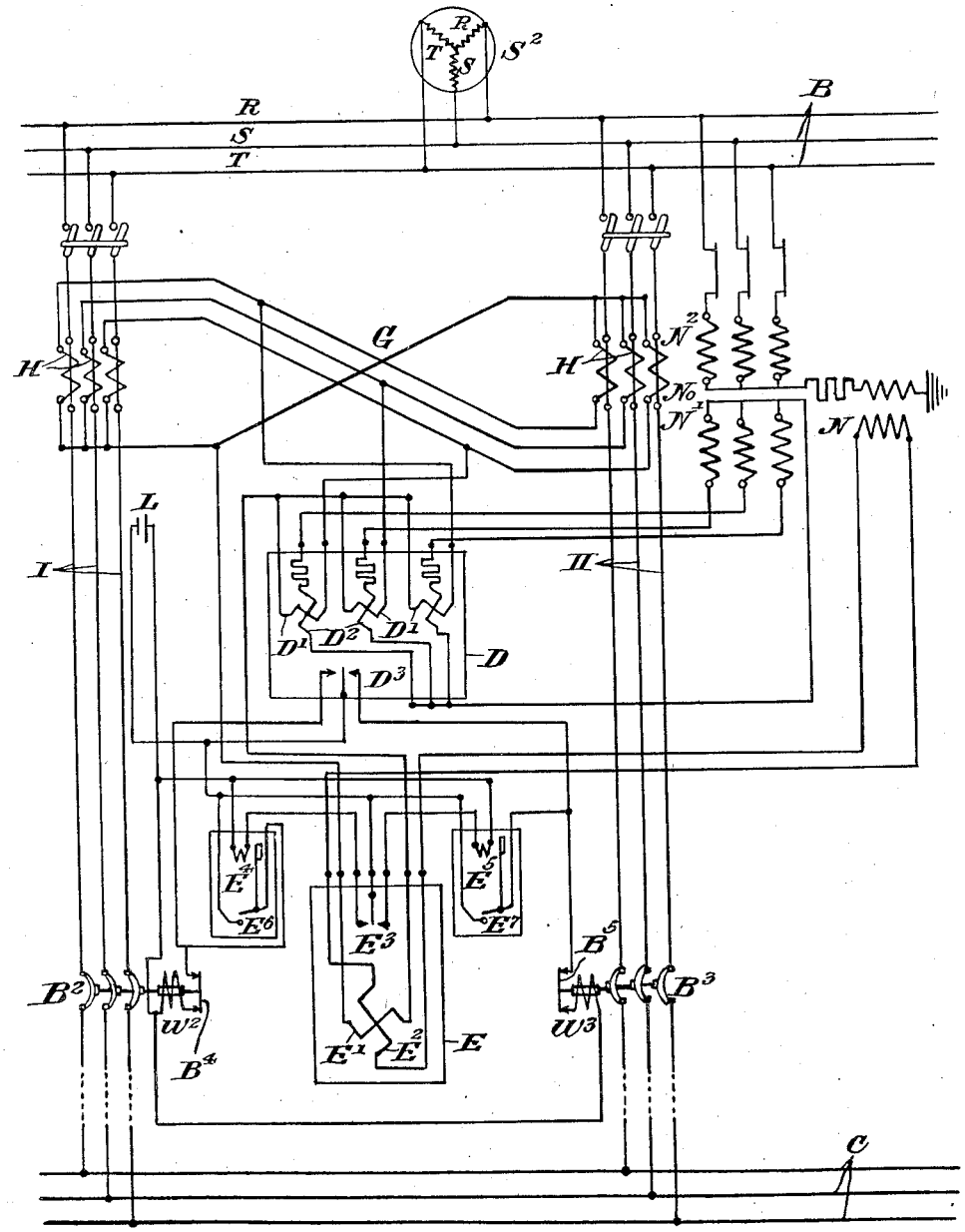
Fig. 1 illustrates diagrammatically the essential parts of a known general arrangement.

Referring first to Fig. 1, $S_2$ is a three phase generator, the neutral of which is not grounded or grounded through a high resistance. R, S, T are the phases of this generator which supplies its energy to the bars B of a section of the distributing network either in a direct manner or through the intermediary of preceding sections. C designates the bars of a following section, which bars are connected to the bars B through two parallel lines I and II.

At each end of such a distributing section a balance is provided, generally indicated by the reference G and mainly comprising current transformers H, a relay D called direction relay and a relay E called earth relay.

As the balances G are the same at both ends and as these balances operate in a similar manner, one balance only has been shown and will be described.

The secondaries of the current transformers H are oppositely connected for respective corresponding phases and their star points are connected together.

The directional relay D is a relay of the wattmeter type, of well known design and comprising three wattmeter elements mounted on the same axle. Such a relay may be constructed in different known ways provided a maximum torque is obtained in case of a three phase short circuit.

For example, each wattmeter element may be of the electro dynamometric type, having its current coil $D_1$ associated with a tension or voltage coil $D_2$ energized by a suitably selected voltage such as a voltage proportional to a phase tension, as illustrated, namely: the tension coil associated with the current coil supplied through the current transformer H associated to the phase R is energized by a voltage proportional to the tension of the phase T; the tension coil associated with the current coil supplied through the current transformer H associated to the phase S is energized by a voltage proportional to the tension of the phase R and the tension coil associated with the current coil supplied through the current transformer H associated to the phase T is energized by a voltage proportional to the tension of the phase S.

Figure 7:
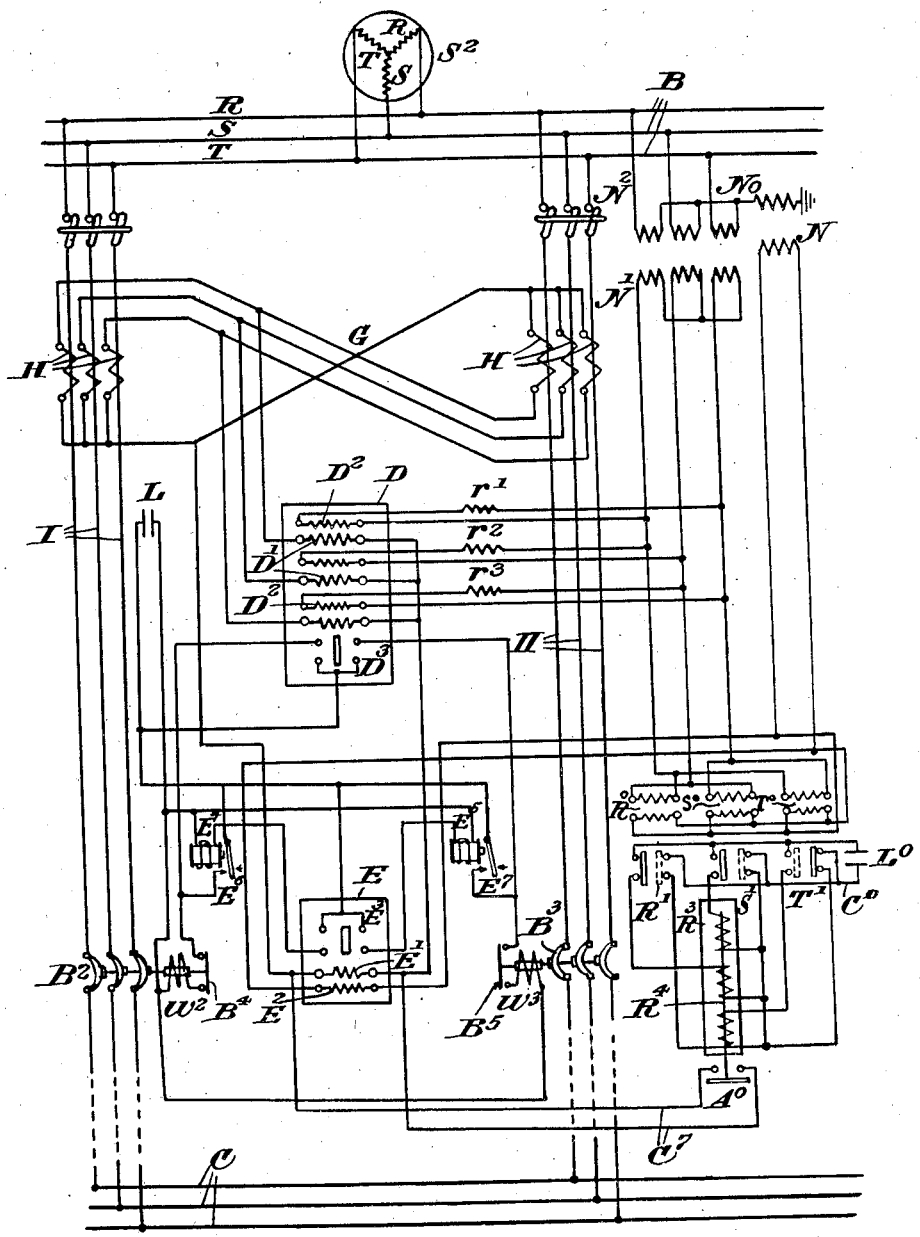
Fig. 7 is a diagram of one form of selective protecting arrangement according to the invention.

Alternately each wattmeter element may be arranged after the manner of an induction meter in which case each current coil of the relay is associated with a voltage or tension coil energized by the voltage which, in the distribution arrangement, is in quadrature with it when $\cos \theta = 1$, an appropriate resistance being selected and connected in series with the tension coil so that the out of phase obtained will be equal to the impedance angle of the circuit comprised between the bars supplying the tension and the short circuit point. Such an arrangement is illustrated in Fig. 7. $D_3$ designates a contact operated by the combined action of the three wattmeter elements of the relay D and adapted to be deflected in both directions.

The earth relay E is a relay of the wattmeter type the current coil $E_1$ of which is supplied with the current resulting from the fault and the tension coil $E_2$ of which is energized by a tension proportional to the tension of the neutral point relative to earth.

This relay E is constructed so as to give its maximum torque when the flowing current is 90° out of phase relative to the applied voltage.

For example, if such relay is selected of the electrodynamometric type, the current flowing through its tension or voltage coil is artificially dephased 90° behind the applied voltage in order that such current and the current flowing through its current coil should be in phase, whereby a torque of maximum value is obtained.

The current coil $E_1$ of the relay E is connected in series with each of current coils $D_1$ of the directional relay D, the respective circuits being connected in the bridges of the balance G as shown, and the voltage or tension coil $E_2$ of the earth relay is connected to the ends of the secondary winding of a step down voltage transformer N, the primary winding of which connects the neutral point $N^0$ of a voltage transformer $N^2$ to the earth.

$E_3$ designates a contact associated to and controlled by the relay E, such contact being adapted to be deflected in both directions.

$E_4$ and $E_5$ are relays adapted to control with an appropriate time delay the two contacts $E_6$ and $E_7$ respectively, and $B_2$ and $B_3$ are circuit breakers associated to the lines I and II respectively, said circuit breakers being actuated, together with their corresponding contacts $B_4$ and $B_5$, through associated trip coils $W_2$ and $W_3$ respectively.

L is a local source of current energizing the combined auxiliary circuits illustrated. The protective system as outlined above is common in the art, and no claim is made about this arrangement. The operation is as follows:

When the contact $D_3$ is closed to the right upon an appropriate operation of the directional relay D, the current of the local source L is allowed to flow through the trip coil $W_3$ thus actuating the circuit breaker $B_3$ and the contact $B_5$ thereby cutting the line II as well as the local circuit just closed.

When the contact $D_3$ is closed to the left upon operation of the directional relay D in the other direction, the current of the local source is allowed to flow through the trip coil $W_2$ thus actuating the circuit breaker $B_2$ and the contact $B_4$, thereby cutting the line I as well as the local circuit just closed.

When contact $E_3$ is closed to the right upon an appropriate operation of the earth relay E, the current of the local source flows first through relay $E_5$ and, upon operation of this relay and closure of contact $E_7$, through the trip coil $W_3$ thus actuating the circuit breaker $B_3$ and the contact $B_5$ thereby cutting the line II as well as the local circuit just closed.

When contact $E_3$ is closed to the left upon operation in reverse direction of the earth relay E, the current of the local source flows first through the relay $E_4$ and, upon operation of this relay and closure of the contact $E_6$, through the trip coil $W_2$, thus actuating the circuit breaker $B_2$ and the contact $B_4$, thereby cutting the line I as well as the local circuit just closed.

As previously stated, the directional relay D is intended to operate on short circuit faults appearing on the lines and the earth relay E is intented to operate on earth faults, the operations of these relays being briefly as follows.

Referring to Fig. 1$a$ which represents diagrammatically and in a conventional manner the essential parts of one of the balances of a section formed with the bars B and C and the two lines I and II and assuming as illustrated that a short circuit fault has occurred on line II, for example between the phases R and S thereof, the currents flowing through the lines are not longer equal but are divided in accordance with the law of the derived circuits, that is in a manner inversely proportional to the length or in other words to the impedance of the circuits.

Under such circumstances, currents flow through the balance and through the current coils of both the directional and earth relays, $I_R$—$i_r$ being the current flowing through the current coil of the directional relay belonging to the phase R and $I_S$—$i_s$ being the current flowing through the current coil of the directional relay belonging to the phase S.

As these current coils are associated with tension coils energized through the phases T and R respectively (see Fig. 1) torques are obtained such as those $I_R \times E_T$ and $I_S \times E_R$ illustrated in Fig. 1$b$ from which will be seen that these two torques are of the same conventional sign, the angle formed between the constitutive vectors being in both cases larger than 90°.

These two wattmeter elements of the directional relay being mounted on the same axle and their torques being of the same direction their actions are summed up on the axle.

The third phase T not being affected by the short circuit no current flows through the current coil of the third wattmeter element which remains without action while the earth relay E remains inoperative as its voltage or tension coil is not energized.

The directional relay operating in the manner above described, the contact $D_3$ (Fig. 1) is deflected to the right and the consequent actuation of the auxiliary circuits and trip coil $W_3$ will cut out the faulty line II.

The arrangement operates in a similar manner on a short circuit fault appearing on line I, said line being cut out through the action of the trip coil $W_2$.

Now assuming the fault is a simple earth, occurring for example on phase R of line II, a capacity current, conveniently designated "$I_{Rc}$" flows from the bars towards the fault, the two other phases remaining in balance. The neutral point $N^0$, (Fig. 1) takes a certain potential relative to earth, such potential being applied to the primary winding of the step down transformer N.

Consequently the tension coil $E_2$ of the earth relay is energized and as the current coil $E_1$ of said relay is energized by the capacity current aforesaid, a torque is obtained as illustrated in Fig. 1$c$, in which figure the potential value taken by the neutral point is assumed to be that of the phase R.

The direction of the torque depends on the direction of flow of the capacity current through the relay E and consequently contact $E_3$ (Fig. 1) will be deflected in the one or the other direction according to line on which the fault has appeared. In the considered example, contact $E_3$ will be deflected to the right closing the circuit of the local source L so that relay E₅ will be energized, such relay in turn closing its contact E₇ after the selected time whereby the circuit of the trip coil W₃, is closed causing the breaker B₃ to cut out the faulty line II.

However, it must be observed that the capacity current $I_{RC}$ aforesaid also flows through the current coil of the directional relay D which corresponds to the phase R, the direction of such flow being that of a short circuit current flowing from the bars towards the fault and Fig. 1b shows that the resulting torque is reverse as compared with the torque of the current $I_R$, whereby the directional relay tends to operate in a direction reverse to that obtained in the case of the short circuit.

As the directional relay D is generally allowed to act in an instantaneous manner while on the contrary the action of the earth relay E is delayed, it follows that line I will be cut out instead of the faulty line II.

To avoid this drawback, it has been proposed to connect to the secondary bars of the step down voltage transformer N an auxiliary potential relay controlling the directional relay and constructed so as to operate for tensions higher than a predetermined value while remaining inoperative for tensions below such value, the arrangement being such that the directional relay remains in operative condition as long as the auxiliary potential relay is inoperative.

Assuming e to be the value of the phase tension of the distributing network, the auxiliary potential relay is adapted to operate for potential values comprised between e and $$\frac{e}{2}$$

and to remain inoperative for potential values below $$\frac{e}{2}$$

Theoretically in the case of a simple earth the tension between the neutral point and earth will have the value e but in practice such a tension varies, the "ground" showing generally a more or less resistance so that the actual tension may become less than $$\frac{e}{2}.$$

For such a low value of the tension the auxiliary relay is inoperative and the directional relay may operate.

On the other hand the operation of the directional relay D must be preserved for values of the said tension below $$\frac{e}{2},$$

as the value $$\frac{e}{2}$$

corresponds to the tension obtained between the neutral point and earth in case of a double earth fault occurring on different phases and when the earth connections are adjacent one another and practically without resistance.

To avoid these and other drawbacks and in accordance with my invention I provide three wattmeter relays adapted to be deflected in both directions and individually connected to the distribution phases, the said relays being combined with supplementary auxiliary circuits and apparatus as hereafter more fully described.

In reference to Fig. 1d illustrating diagrammatically the principle of my improved arrangement I and II again designate the two lines connected to the bars B and C of one section of the distributing network, G designates one of the balances arranged at both ends of the section; D is the directional relay and E is the earth relay, the local source of current L and the auxiliary circuits energized by said source being in every respect the same as before.

$R^0$, $S^0$, $T^0$ designate the said three wattmeter relays individually connected to the distribution phases.

One of the windings of each of said relays is connected to the secondary winding of the transformer N and consequently energized by a tension proportional to the common voltage of the neutral point $N^0$ of the transformer $N_2$ relative to earth while the other coils of the relay $R^0$, $S^0$, and $T^0$ are illustrated as being energized by the voltages of the phases R, S, T respectively.

Each of these relays $R^0$, $S^0$, $T^0$ is associated to and controls a contact adapted to be deflected in both directions, these contacts being designated by the references $R^1$, $S^1$, and $T^1$.

The contacts $R^1$, $S^1$, and $T^1$ are arranged in a circuit $C^0$ including a local source $L^0$ as well as a relay $R^3$ the winding of which is divided as shown into three equal parts.

With the arrangement as described, and assuming an earth connection occurs on one of the phases and for example the phase R of line I, the neutral point $N^0$ takes a certain potential relative to earth and consequently the coils of the wattmeter relays $R^0$, $S^0$, and $T^0$ which are connected to the secondary winding of the transformer N are energized.

As in each of the relays $R^0$, $S^0$, and $T^0$ the other coil is energized by one of the phase voltages, torques are set up in said relays.

These torques are seen in Fig. 2 illustrating in a well known conventional manner a three phase arrangement and in which the vectors $OE_R$, $OE_S$, and $OE_T$ represent the voltages of the phases R, S, and T respectively and the vector e shown in dotted lines in the upper part of the figure indicates the potential taken by the neutral point N° while the phase R is connected to earth.

Such potential has been illustrated as being the tension of the phase R but is usually a part of such tension.

If for convenience, the vector e is shifted to the point O along its direction of action, the figure clearly shows that the angles formed between the vector e and both the vectors $OE_T$ and $OE_S$ are smaller than 90° while the angle formed between the vector e and the vector $OE_R$ is greater than 90°. The torques are consequently of different signs.

If the sign minus (—) is given to a torque the components of which form an angle greater than 90° and the sign plus (+) is given to a torque the components of which form an angle smaller than 90° then the torque $eE_R \cos (eOE_R)$ of one of the wattmeter relays is negative and the torques of the two other relays, $eE_T \cos (E_T Oe)$ and $eE_S \cos (E_S oe)$, are positive.

Consequently one of the relays is deflected in one direction and the two other are deflected in the opposite direction.

Assuming now that the fault which has occurred on the line is a double earth connection or a short circuit to earth on the phases R and S, and applying the same rules as to the showing and the same convention as to the signs, it will be seen from Fig. 1e that two of the relays have a negative torque, namely $e \times Or$ cos $E_TOr$ and $e \times Os$ cos $E_TOs$, and will be deflected in the first direction aforesaid while one relay has a positive torque, namely $eE_T$ cos $eOE_T$ and is deflected in the second direction.

The aforesaid operations of the relays $R^0$, $S^0$, $T^0$ distinguishes the case of a simple earth from the case of a double earth, and in order to effectively protect the distribution network secondary or auxiliary circuits are associated with the wattmeter relays and so arranged that the directional relay D is prevented to act in the first case, simple earth (one relay deflected in one direction and two relays deflected in the second direction) while the earth relay is prevented to act in the second case, double earth (two relays deflected in the first direction and the third relay deflected in the second direction).

This may be effected by means of the contacts $R^1$, $S^1$, $T^1$, which are deflected simultaneously to and in accordance with their respective relays $R^0$, $S^0$, and $T^0$, in combination with the associated relay $R^3$ as will be described later on.

However, in some cases the distribution system may comprise a network at very high tension associated with a low tension network.

In such a case and if to avoid the expenses of step down transformers constructed for such high tensions, the wattmeter relays $R^0$, $S^0$, $T^0$ of the protective arrangement are energized by means of a step down transformer the primary winding of which is connected to the low tension network, the operation of the above described arrangement may become incorrect when certain faults occur simultaneously on the high and low tension networks.

The diagram of Fig. 3 representing, except as to the scale, both the high and the low tension networks, assuming by way of example that the phases R and S of the low tension network are short circuited, and the conditions of this fault are such as shown, while one of the phases R or S and for example the phase R is earthed on the high tension side, applying the aforesaid rules and convention as to the signs of the torques, the torques of the wattmeter relays are:

$or^1 \times oT$ cos $Tor^1$
$or^1 \times os$ cos $r^1os$
$or^1 \times or$ cos $r^1or$ The torque of one of the relays is positive ($or^1 \times oT$ cos $Tor^1$) as the angle $Tor^1$ is smaller than 90° while the torques of the two other relays are negative ($or^1 \times os$ cos $r^1os$ and $or^1 \times or$ cos $r^1or$)

as the angles $r^1os$ and $r^1or$ are each greater than 90°. Thus this simple earth on the high tension side leads to the same operation of the wattmeter relays as in the aforesaid case of double earth and consequently to an incorrect action of the directional and earth relays, the earth relay being rendered inoperative while it has to operate to cut off the earthed phase of the high tension network.

It will be observed then when the conditions of the short circuit between the phases R and S of the low tension network are such that the angle $ros$ between the vectors $or$ and $os$ becomes 90° the value of cos $r^1os$ is zero and the corresponding torque vanishes. As at the same time one of the remaining torques is positive while the other is negative the action becomes uncertain.

Drawbacks of this kind are however avoided when the wattmeter relays are energized on the one hand by means of the interphase voltages and on the other hand by means of a current which is 90° in phase behind the voltage of the neutral point.

With the same conditions of distribution as above, that is when the distribution comprises a high tension network associated with a low tension network, and in reference to Fig. 4 illustrating the case of a simple earth on the high tension side and in which R—S, S—T, and T—R designates the interphase voltages, $e$ the tension or voltage (shifted for convenience to the point $o$) at the neutral point due to the earth on the phase R, and $i$ the current which is 90° in phase behind the said voltage $e$, it will be seen that one of the torques is negative and two torques are positive, namely:

$o\ i \times ST$ cos 180°; negative by convention
$o\ i \times TR$ cos; positive
$o\ i \times RS$ cos; positive In case of a double earth (Fig. 5) in which $e_{r-s}$ $e_{s-t}$ and $e_{t-r}$ are the interphase voltages and $i$ the current 90° in phase behind the voltage $e$ of the neutral point as above, one of the torques is positive and the two other torques are negative, namely:

$i \times e_{r-s}$; positive
$i \times e_{t-r}$; negative
$i \times e_{s-t}$; negative Assuming that at the same time a short circuit occurs on the low tension side and an earth, for example on the phase R, on the high tension side and the same rules and convention being applied, it will be seen (Fig. 6) that two torques are positive and one torque is negative, namely:

$i \times r-s$; positive
$i \times t-r$; positive
$i \times s-t$; negative

In all cases the operation is correct and the use of compound or interphase voltages is consequently to be preferred to that of the phase to neutral voltages.

A protective arrangement in which the wattmeter relays $R^0$, $S^0$, and $T^0$ are supplied in the manner just explained is illustrated in Fig. 7.

In this figure the general arrangement of the bars B and C, current transformers H, relays D and E, step down voltage transformer N, local source L, and auxiliary circuits and apparatus, including the circuit breakers is just as described in reference to Fig. 1, except that the tension coils of the directional relay D are energized by means of interphase voltages, suitable resistances $r_1$, $r_2$, and $r_3$ being inserted in the connecting leads as previously indicated to take care of the impedance of the distribution lines.

$R^0$, $S^0$, and $T^0$ are the three wattmeter relays in each of which one of the coils is energized by one of the interphase voltages and the other coil is energized through a current produced by the voltage at the neutral point and lagging 90° behind this voltage, said coil being connected for this purpose to the secondary winding of the step down voltage transformer N as shown.

$R^1$, $S^1$, $T^1$ designate the three contacts controlled by and associated to the wattmeter relays $R^0$, $S^0$, and $T^0$ respectively and adapted to be deflected in both directions in accordance with the deflections of the corresponding relays $R^0$, $S^0$, and $T^0$.

The control connection between the relays $R^0$, $S^0$, and $T^0$ and their corresponding contacts $R^1$, $S^1$, and $T^1$ may be arranged in any well known manner, as soon as a different direction of deflection of a contact corresponds to a different sign of the torque in the corresponding relay.

In the following explanations concerning this figure it will be assumed that a deflection to the left of a contact corresponds to a "negative" torque in the corresponding relay while a deflection to the right of the contact corresponds to a "positive" torque in the corresponding relay.

The contacts $R^1$, $S^1$, and $T^1$ are inserted in a circuit $C^0$ supplied through the local source $L^0$ and including a relay $R^3$ having a core $R^4$ and the winding of which is divided as shown into three equal parts, the arrangement being such that when two of the three contacts and for example the contacts $R^1$ and $S^1$, are deflected to the left and one contact ($T^1$) is deflected to the right, as shown in full lines, two thirds of the winding of the relay $R^3$ are energized and its core $R^4$ is attracted while when the two contacts $R^1$ and $S^1$ are deflected to the right and the contact $T^1$ is deflected to the left as shown in dotted lines one third only of the winding $R^3$ is energized and the core $R^4$ remains stationary.

The core $R^4$ carries a contact $A^0$ forming part of a circuit $C^7$ including the current coil of the earth relay E. When the core $R^4$ of the relay $R^3$ is attracted by the winding of said relay that is when at least two thirds of the winding are energized, the contact $A^0$ is closed and the current coil of the earth relay E is short circuited.

With the arrangement just described when an interphase short circuit occurs on one of the lines, the directional relay operates while the earth relay remains inoperative since its voltage or tension coil is not energized.

In the case of a simple earth the torque of one of the relays $R^0$, $S^0$, and $T^0$ is negative while the two other relays have positive torques as above explained and consequently one contact is deflected to the left and two contacts are deflected to the right, as shown in dotted lines thereby energizing only one third of the winding of the relay $R^3$ which remains inoperative. The earth relay E may operate to cut off the faulty line.

However, since the current of the earth fault is a capacity current, and as already explained, the directional relay may operate incorrectly, cutting off the sound line. This is avoided through means described later on.

In the case of a double earth one of the torques of the relays $R^0$, $S^0$, and $T^0$ is "positive" and the two other relays have "negative" torques. Consequently one contact is deflected to the right and the two other are deflected to the left as shown in full lines thus energizing two thirds of the relay $R^3$. This relay operates its core $R^4$ and closes the contact $A^0$ thereby short circuiting the tension coil of the earth relay E which becomes inoperative.

The directional relay may operate whatever may be the value of the potential of the neutral point $N^0$.

In an arrangement such as that just described relays the construction of which is based on Mr. Fortescue's theory and called "out of balance theory" may be used with advantage instead of the directional and earth relays.

In such a case, as a directional relay use is made of a so called "inverse power relay". The inverse power relay is a wattmeter relay, but which, contrary to the known directional relays, has no torque in case of a simple earth and could not function incorrectly in that case.

Consequently it is unnecessary to place such a relay out of action in the case of a simple earth.

As earth relay, use is made of a so called "residual power relay" which in certain cases of double earth shows the same drawback as the ordinary earth relay, that is to operate incorrectly.

As in the arrangement in accordance with Fig. 7 the operation of the earth relay is prevented in case of double earth, a correct operation of the arrangement will be obtained with the said residual power relay.

In the arrangement in accordance with Fig. 7, and while ordinary directional and earth relays are used the operation of the relay $R^3$ renders the earth relay E inoperative in the case of a double earth.

However, it results from practical considerations, that it is more convenient to have the directional relay placed in operative condition and the earth relay in inoperative condition while the relay $R^3$ is unenergized. In such a case the relay $R^3$ has to operate in such a way that the directional relay becomes inoperative while the earth relay is placed in operative condition in case of a simple earth.

For this purpose the control connections between the relays $R^0$, $S^0$, and $T^0$ and their corresponding contacts $R^1$, $S^1$, and $T^1$ are such that the deflection to the left of a contact corresponds to a "positive" torque in the corresponding relay while a deflection to the right of the contact corresponds to a "negative" torque in the corresponding relay.

Figure 8:
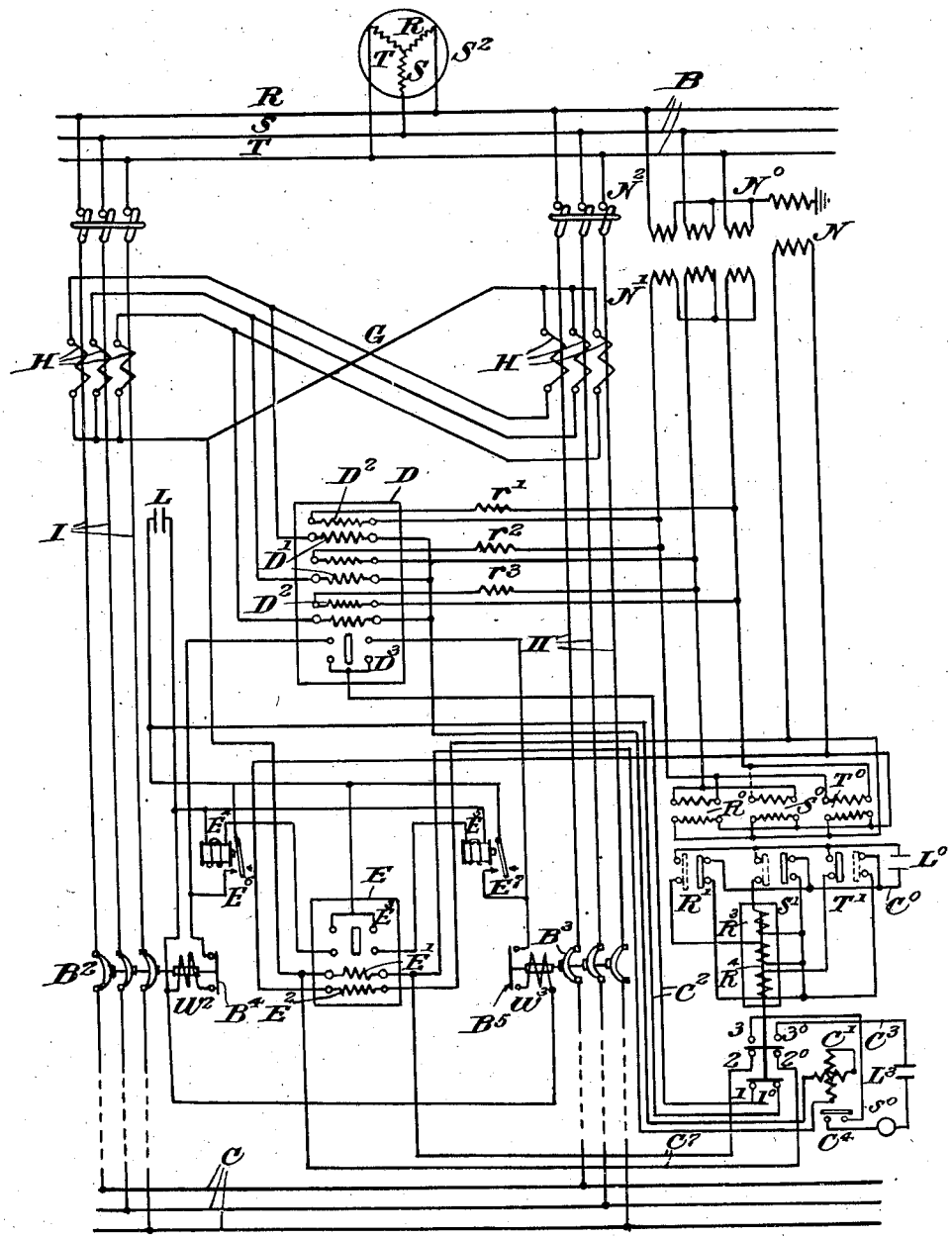
Fig. 8 is another diagram of this arrangement.

Such an arrangement is illustrated in Fig. 8 in which except as to the aforesaid modifications and those just to be described the arrangement is similar to that of Fig. 7.

In Fig. 8 the relay $R^3$ controls the action of a contact device comprising two pairs of contacts, 1, $1^0$ and 2, $2^0$. One pair of these contacts, namely, 1, $1^0$, forms part of the circuit $C^2$ including the contact $D^3$ and thereby controlling the operation of the directional relay D.

In this manner, when one third only of the winding of the relay $R^3$ is energized, the contacts 1, $1^0$ remain closed and the directional relay may operate while when the two thirds of the winding of the relay $R^3$ are energized the contacts 1, $1^0$ are opened and the operation of the directional relay is prevented.

The other pair of contacts, namely, 2, $2^0$ forms part of a circuit comprising the current coil $E^1$ of the earth relay E, with the result that when one third only of the winding of the relay $R^3$ is energized the current coil of the earth relay E is short circuited and the said relay is consequently inoperative while when two thirds of the winding of the relay $R^3$ are energized, the said circuit opens at the contacts 2, $2^0$ and the earth relay E may operate.

In operation, when a simple earth occurs on one of the lines, two of the contacts $R^1$, $S^1$, and $T^1$ are deflected to the right and one contact is deflected to the left, for example as shown in full lines, thereby energizing two thirds of the winding of the relay $R^3$ which attracts its core or armature $R^4$ and breaks down the contacts 1, $1^0$ and 2, $2^0$. The directional relay D becomes inoperative while the earth relay E may operate to cut off the faulty line.

In the case of a double earth two of the contacts $R^1$, $S^1$, and $T^1$ are deflected to the left and one contact is deflected to the right, for example as illustrated in dotted lines. One third only of the winding of the relay $R^3$ is energized and its core or armature $R^4$ remains stationary. Consequently the contacts 1, $1^0$ and 2, $2^0$ remain closed and the directional relay D may operate while the earth relay E is inoperative as its current coil is short circuited.

It will be appreciated that in the arrangement in accordance to Fig. 8 the "inverse power relay", which has no torque in case of a simple earth may be used in lieu of an ordinary directional relay since in this figure the directional relay may operate in the case of an interphase short circuit as well as in the case of a double earth while its operation is prevented in the case of a simple earth.

Also the residual power relay may be used in lieu of the usual earth relay, since the operation of the earth relay of Fig. 8 is prevented except in the case of a simple earth.

In case an inverse power relay is used instead of the ordinary directional relay; the contacts 1, $1^0$ may be dispensed with.

In the foregoing the network sections have been considered generally. However, on a distributing network the first section constitutes a particular part thereof since when the distribution is insured through a single line as for example when one of two parallel lines only remains in service. When in this case one of the phases of the line is earthed the capacity currents flowing through the two other phases return to the generator and therefrom to earth.

Consequently the sum of the currents flowing through the line as well as through the current coil of the earth relay E is zero. The earth relay E is without torque and fails to operate.

In order to obtain the necessary cutting action on the line or at least to be warned of the fault I provide a circuit $C^3$ including a local source $L^3$ and any suitable kind of warning signal $s^0$ or any suitable apparatus adapted to operate the breakers of the line, as well as a pair of contacts 3, $3^0$ associated to the contacts 1, $1^0$ and 2, $2^0$ and controlled together through the relay $R^3$.

As far as just described, that is to say with the relay $C^1$ and contact $C^4$ omitted, the arrangement enables the desired operation to be obtained on a section adjacent the supply station and comprising a single line, since while the earth relay is without torque in the case of a simple earth the three wattmeter relays $R^0$, $S^0$, and $T^0$ are energized and two of the contacts $R^1$, $S^1$, and $T^1$ are deflected to the right while one contact is deflected to the left, for example as shown in full lines, thereby energizing two thirds of the winding of the relay $R^3$. This relay attracts its core or armature $R^4$, thereby closing the circuit $C^3$ and operating the warning signal $s^0$.

Should it be desirable to use the same arrangement on other sections of a single line, on which the sum of the currents is not zero in the case of a simple earth, so that the earth relay E operates in this case, the arrangement is completed by means of a current relay $C^1$ controlling the operation of a contact $C^4$ inserted in the circuit $C^3$.

The current relay $C^1$ is connected in series with the current coil of the earth relay E and preferably constructed as a square current relay ($I^2$) so as to increase its efficiency for small currents.

In the case of a simple earth, the current flowing through the current coil of the earth relay also flows through the relay $C^1$, thereby energizing this relay which in turn moves the contact $C^4$ to the position indicated in dotted lines. The circuit $C^3$ is opened and the warning signal $s^0$ becomes inoperative.

It is to be observed that when the section adjacent the supply source comprises two parallel lines, the conditions are such that when two lines are in service and a simple earth occurs on one of them the earth relay is energized and may operate its contact $E_3$ and the appropriate breakers of the faulty line, but when one of the lines only remains in service, and a simple earth occurs thereon, no torque takes place in the earth relay which is consequently unable to actuate its contact and to cut off the said remaining line.

Figure 9:
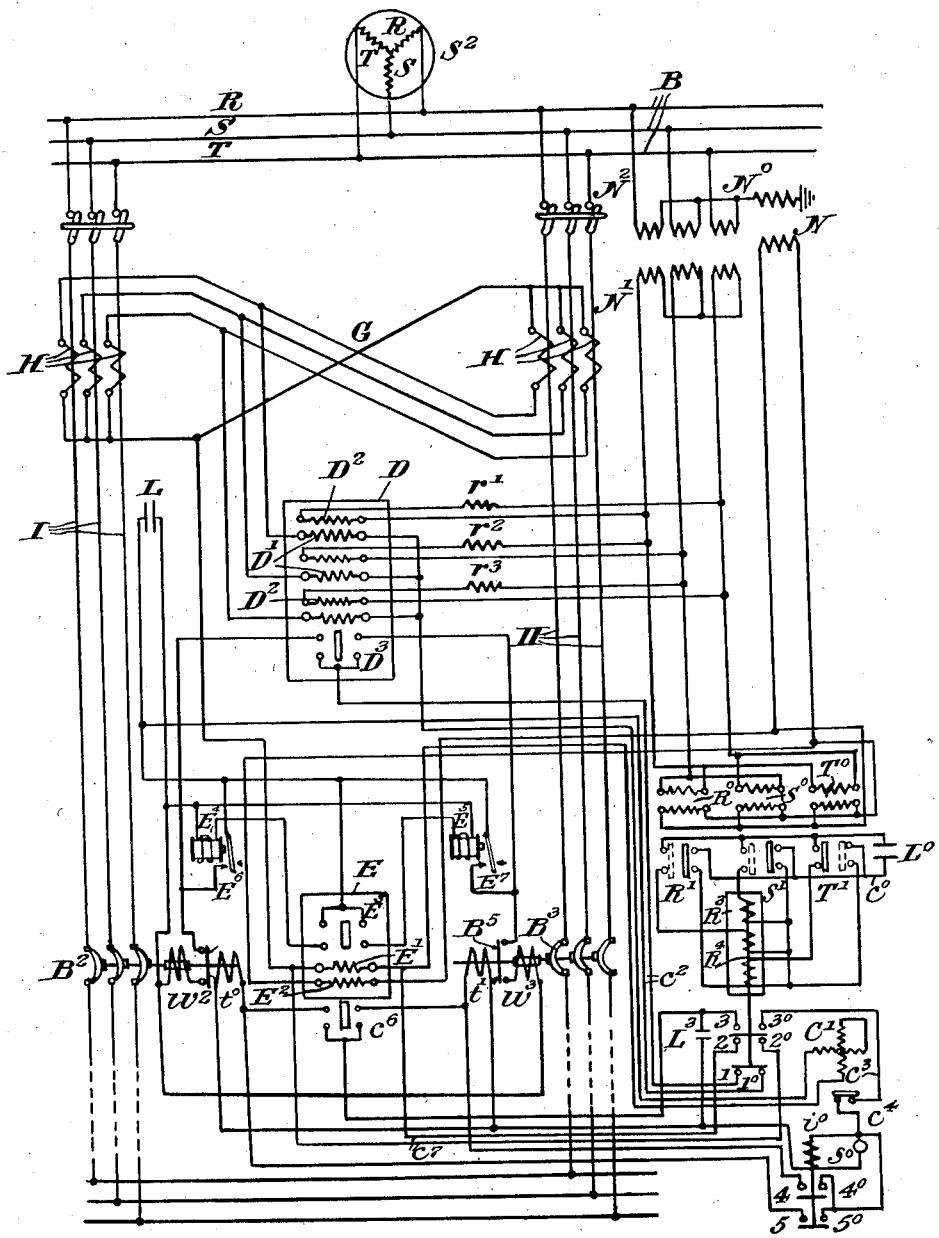
Fig. 9 shows a modification of Fig. 8.

To insure a correct operation in such a case the arrangement in accordance to Figure 8 is completed as illustrated in Fig. 9.

In this figure, the earth relay E is again connected in series with a current relay $C^1$ constructed as a square current relay ($I^2$) and controlling a contact $C^4$.

The circuit of the local source $L^3$ includes, together with the already described contacts 3, $3^0$, and $C^4$ and the warning signal $s^0$, two relays with constant time, $t^0$ and $t^1$ adapted to actuate the breakers of the respective lines, as well as a contact $C^6$ controlled by the earth relay E so as to be deflected in either direction in accordance with the deflection of said relay, and a current relay $i^0$ actuating a contact device comprising two pairs of contacts 4, $4^0$, and 5, $5^0$ respectively, connected in series with the said relays $t^1$ and $t^0$.

The operation of this arrangement is as follows:

Assuming the two parallel lines are in service and a simple earth occurs on one of them, the three wattmeter relays $R^0$, $S^0$, and $T^0$ are energized and the contacts $R^1$, $S^1$, and $T^1$ are deflected so that two thirds of the winding of the relay $R^3$ are energized, thereby actuating the core $R^4$ and at the same time opening the contacts 1, $1^0$ and 2, $2^0$ and closing the contacts 3, $3^0$.

The directional relay D becomes inoperative, the earth relay E as well as the current relay $C^1$ are energized, the relay E deflecting its contact $C^6$ in a direction in accordance with the line on which the fault has occurred while at the same time the relay $C^1$ opens the contact $C^4$.

Consequently the relay $i^0$ is not energized, the warning device $s^0$ remains inoperative while the appropriate relay $t^0$ or $t^1$ is energized and in turn actuates the breakers of the faulty line.

Such line being cut off, if a simple earth appears on the remaining line, the wattmeter relays $R^0$, $S^0$, and $T^0$, contacts $R^1$, $S^1$, and $T^1$ and relay $R^3$ operate as in the former case, thereby closing the contacts 3, $3^0$ and the circuit $C^3$ but as the earth relay E is without torque and the current relay $C^1$ remains unenergized (the sum of the phase currents being zero in the line), the contact $C^6$ remains at rest and the contact $C^4$ in its closed position.

As a result, the warning signal $s^0$ is operated while the relay $i^0$ is energized and closes the contacts 4, $4^0$ and 5, $5^0$ thereby energizing both relays $t^0$ and $t^1$ and in any case cutting off the faulty line.

In the above one single section of a distribution network has been considered at a time while in most cases the distribution comprises several sections which are liable to become simultaneously injured.

By way of example, Fig. 10 represents two adjacent sections of a distributing network with parallel lines having one phase earthed on the section CD and an interphase short circuit on the section AB.

In such a case, while the selective protection is insured by means of arrangements in accordance with Fig. 8 and as the neutral point on whatever section of the line takes a certain potential, the relays $R^0$, $S^0$, and $T^0$ are operated, the relay actuating the contacts $R^1$, $S^1$, and $T^1$ in such a way that two thirds of the winding of the relay $R^3$ are energized as above explained. Consequently the operation of the directional relay on section AB will be delayed until the earth on section CD has been eliminated. This should be avoided.

To this end use is made of the arrangement in accordance with the said Fig. 8, but completed and arranged in such a way that while the relays $R^0$, $S^0$, and $T^0$ are energized owing to the earth connection of the line and are consequently caused to place two thirds of the winding of the relay $R^3$ under tension with the consequent operation of the contacts $1$, $1^0$, $2$, $2^0$ and $3$, $3^0$ as above explained, such operation of the contacts $R^1$, $S^1$, and $T^1$ is prevented when an interphase short circuit appears on the section AB.

To this end, and as illustrated in Fig. 11, the supplying circuit $C^8$ of the contacts $R^1$, $S^1$, and $T^1$ comprises a contact $C^5$ controlled through the relay $C^1$ and remaining normally in its open position.

Under such conditions, and assuming the relays $R^0$, $S^0$, and $T^0$ are energized owing to an earth connection on the section CD, while at the same time an interphase short circuit occurs on section AB, in this section no current flows through the relay $C^1$ and the contact $C^5$ remains in its open position, thus preventing the operation of the relay $R^3$ and permitting the operation of the directional relay.

On section CD, the relay $C^1$ operates and closes the contact $C^5$, thus permitting relay $R^3$ to become energized. This relay operates its core $R^4$ and the contacts $1$, $1^0$, $2$, $2^0$ and $3$, $3^0$, thereby placing the directional relay into inoperative conditions while the earth relay E may operate and deflect the contact $C^6$ in the appropriate direction in accordance with the line on which the earth fault has occurred.

One of the time relays $t^0$ or $t^1$ is thereby energized and causes the operation of the breakers of the faulty line.

It will be observed that while the network comprises several sections, the arrangements in accordance with Figs. 7 and 8 need not to be completed or modified as just explained when the ordinary directional and earth relays are replaced by the aforesaid "inverse power" relay and "residual power" relay respectively, since the "inverse power" relay is not affected by a simple earth and operates on the section AB when an interphase short circuit appears on this section and since in accordance with these arrangements the "residual power" relay is prevented to operate in case of a double earth.

It is also to be observed that nothing will be changed if a double earth exists on the network and a third earth occurs thereon, even when occurring on one of the two phases already earthed. If the earth occurs on the third phase, the case becomes similar to a three phase short circuit to earth for which the directional relay (inverse power relay) is adapted to act.

In reference to Fig. 8, it has been shown that on the section adjacent the supply station and while one single line is or remains in service on this section, the sum of the currents flowing through the line is zero in case of a simple earth.

When on such a section it is desirable to use the arrangement in accordance with Figure 7 the same conditions are prevailing but as in such an arrangement the relay $R^3$ does not actuate its core $R^4$ in the case of a simple earth (one third only of its winding being energized), with a single line in service I provide a voltage relay energized by the voltage at the neutral point and preferably arranged as a square tension relay ($E^2$) such a relay controlling a circuit energized by means of the current of a local source and including a trip coil breaker adapted to operate with the required time delay.

Figure 12:
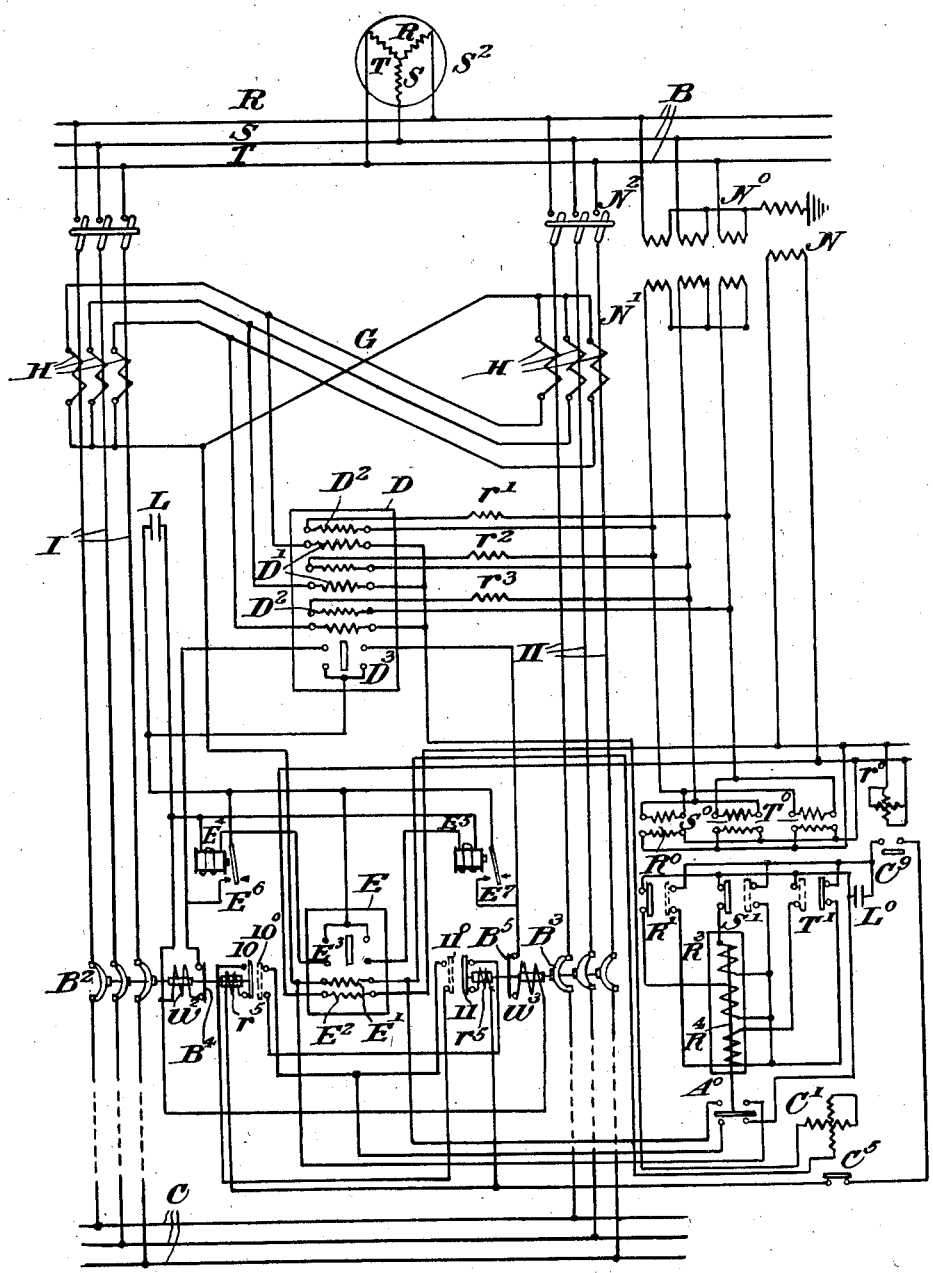
Fig. 12 is a completed diagram of the selective protecting arrangement according to Fig. 8.

In case the distribution comprises two parallel lines I complete the arrangement of Fig. 7 in accordance with Fig. 12 that is to say I provide a voltage relay $r^0$ arranged as a square tension relay ($E^2$) and connected to the secondary bars of the transformer N as shown, such relay controlling a normally opened contact $C^9$.

I also provide a current relay $C^1$ connected in series with the earth relay E and controlling a normally closed contact $C^5$, as well as relays $r^5$, arranged in circuit with a contact device $10$ belonging to the circuit breaker $B^2$ of one line and with a contact device $11$ belonging to the circuit breaker $B^3$ of the other line.

These contact devices are closed at $10$ and $11$ for the position of engagement of the circuit breakers and at $10^0$ and $11^0$ for the position of disengagement of said circuit breakers.

Under such conditions, the relays $r^5$ remain inoperative unless the relay $r^0$ has closed its contact, the relay $R^3$ is inoperative, the relay $C^1$ is unenergized and one of the circuit breakers $B^2$ or $B^3$ is in the position of engagement while the other occupies the position of disengagement, that is to say, while one of the lines remains in service and a simple earth occurs on the section thereof adjacent the supply station.

Figure 13:
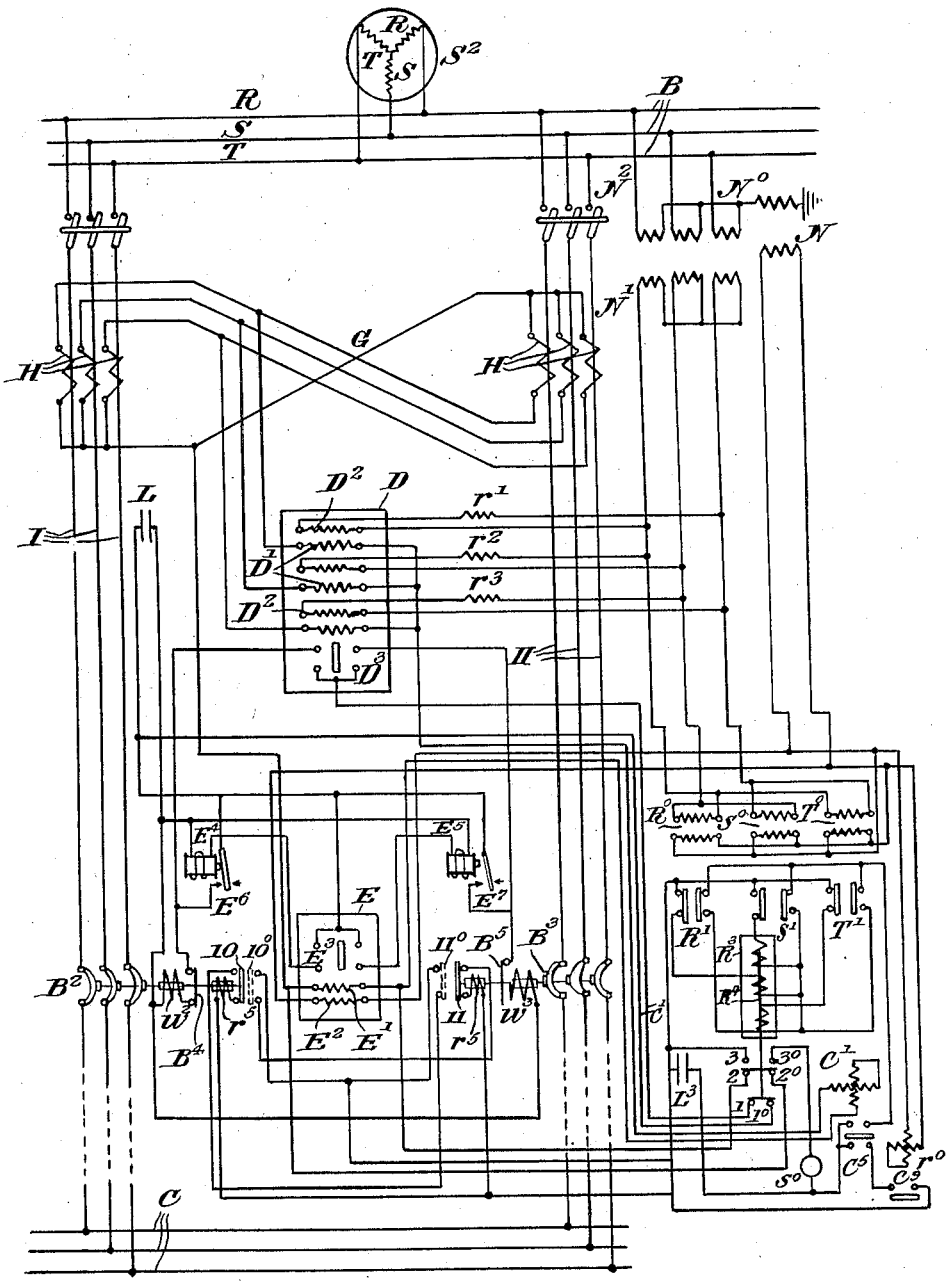
Fig. 13 is a completed diagram of the selective protecting arrangement of Fig. 11.

Assuming it would be desirable to make use of the arrangement in accordance to Fig. 11 on the section adjacent the supply station of a distributing network comprising two parallel lines, such arrangement is completed as illustrated in Fig. 13.

In accordance with this figure, I provide a relay $r^0$ arranged as a square tension relay ($E^2$) and controlling a contact $C^9$ remaining normally in its open position, such contact being connected in circuit with the aforesaid relays $r^5$ and contact devices $10$ and $11$ of the circuit breakers $B^2$ and $B_3$ each of which corresponds to one of the lines. As in Figure 11 I provide a current relay $C^1$ connected in series with the current coil of the earth relay E and controlling a contact $C^5$ arranged in circuit with the contact $C^9$, relays $r^5$ and contact devices $10$ and $11$ but remaining normally in closed position.

Under such conditions the relays $r^5$ remain inoperative unless the relay $r^0$ has closed its contact, the relay $C^1$ is unenergized and one of the circuit breakers $B^2$ or $B^3$ is in the position of engagement while the other occupies the position of disengagement, that is to say that one of the lines remains in service and that a simple earth has occurred on the section.

It is obvious that modifications may be made in the described arrangements without departing from the scope of the invention as defined in the appended claims.

I claim:

1. Selective protecting means for distribution networks with an insulated neutral point comprising a directional relay, an earth relay, relays individually connected to the distribution phases and controlling the operations of the said directional and earth relays, and means for transmitting the control action of the relays individually connected to the distribution phases to the said directional and earth relays.

2. Selective protecting means for distribution networks with an insulated neutral point comprising a directional relay, an earth relay, wattmeter relays individually connected to the distribution phases and controlling the operations of the said directional and earth relays, and means for transmitting the control action of the wattmeter relays to the directional and earth relays.

3. Selective protecting means for distribution networks with an insulated neutral point comprising a directional relay, an earth relay, wattmeter relays individually connected to the distribution phases, a relay common to the wattmeter relays and controlled in operation by the said wattmeter relays, the last named relay controlling the operations of the said directional and earth relays, and means for transmitting the control action of the said last named relay to the directional and earth relays.

4. Selective protecting means for distribution networks with an insulated neutral point comprising a directional relay, an earth relay, wattmeter relays of the monophase type, means to energize one coil of said relays with a voltage related to the voltage of the neutral point, and means to connect the other coils of these relays to the distribution phases, a relay common to the wattmeter relays and controlled thereby, the last named relay controlling the operations of the said directional and earth relays, and means for transmitting the control action of the said last named relay to the directional and earth relays.

5. Selective protecting means for distribution networks with an insulated neutral point comprising a directional relay, an earth relay, wattmeter relays individually connected to the distribution phases, a relay common to the wattmeter relays, said relay including a divided winding and each winding part associated with one of the wattmeter relays, the said last named relay controlling the operations of the said directional and earth relays, and means for transmitting the control action of said last named relay to the directional and earth relays.

6. Selective protecting means for distribution networks with an insulated neutral point comprising a directional relay, an earth relay, wattmeter relays individually connected to the distribution phases, a relay common to the wattmeter relays, said relay including a divided winding, a source of current and each winding part energized by said source under the control of the said wattmeter relays, and the said last named relay controlling the operations of the said directional and earth relays, and means for transmitting the controlling action.

7. Selective protecting means for distribution networks with an insulated neutral point comprising a directional relay, an earth relay, wattmeter relays individually connected to the distribution phases, a set of contacts, each contact of this set deflected in both directions and controlled in operation by one of the wattmeter relays, a relay including a divided winding, a source of current and each part of the divided winding energized by said source through one of the said contacts under the control of one of the wattmeter relays and the said last named relay controlling the operations of the said directional and earth relays, and means for transmitting the controlling action.

8. Selective protecting means for distribution networks with an insulated neutral point comprising a directional relay, an earth relay, wattmeter relays individually connected to the distribution phases, a set of contacts, each contact of this set deflected in both directions and controlled in operation by one of the wattmeter relays, a relay including a divided winding, a source of current and each part of the divided winding energized by said source through one of the contacts under the control of one of the wattmeter relays, a contact device associated with the last named relay, and the operation of the said contact device controlling the operations of the said directional and earth relays, and means for transmitting the controlling action.

9. Selective protecting means for distribution networks with an insulated neutral point comprising a directional relay, an earth relay, wattmeter relays individually connected to the distribution phases, a set of three contacts, each contact of this set deflected in both directions and controlled in operation by one of the wattmeter relays, a relay including a winding divided into three equal parts, a source of current and each part of the divided winding energized by said source under the control of one of the said wattmeter relays, a contact device associated with the last named relay and controlling the operations of one of the said directional and earth relays and means for transmitting the controlling action, the arrangement being such that the said contact device is actuated when at least two thirds of the divided winding are energized.

10. Selective protecting means for distributing networks with an insulated neutral point comprising a directional relay, an earth relay, wattmeter relays individually connected to the distribution phases, a set of three contacts each contact of this set deflected in both directions and controlled in operation by one of the wattmeter relays, a relay including a winding divided into three equal parts, a source of current and each part of the divided winding energized by said source under the control of one of the said wattmeter relays, a contact device associated with the last named relay, circuits including the said contact device and controlling the directional and earth relays and the said contact device being actuated when at least two thirds of the divided winding are energized, thereby placing one of the said directional and earth relays out of operative condition.

11. Selective protecting means for distribution networks in accordance with claim 10 in which the directional relay is an inverse power relay, and the earth relay is a residual power relay.

12. Selective protecting means for distribution networks with an insulated neutral point comprising a directional relay, an earth relay, wattmeter relays individually connected to the distribution phases, a set of three contacts, each contact of this set deflected in both directions and controlled in operation by one of the wattmeter relays, a relay including a winding divided into three equal parts, a source of current and each part of the divided winding energized by said source through one of the said contacts under the control of one of the wattmeter relays, a contact device associated with the last named relay, said contact device comprising three contacts, a circuit including one of the last named contacts and controlling the directional relay, a circuit including another of the last named contacts and controlling the earth relay whereby when such circuit is closed the current coil of the earth relay is short circuited, a source of current, a warning signal and a circuit including said last named source, the warning signal and the third of the last named contacts, and means to close said last named circuit around the warning signal when no current flows through the current relay, whereby the warning signal is operated on the section adjacent the supply source of a distribution network when one line is in service and a simple earth occurs on such section.

13. Selective protecting means for distribution networks with an insulated neutral point comprising a directional relay, an earth relay, wattmeter relays individually connected to the distribution phases, a set of three contacts, each contact of this set deflected in both directions and controlled in operation by one of the wattmeter relays, a relay including a winding divided into three equal parts, a source of current and each part of the divided winding energized by said source through one of the said contacts under the control of one of the said wattmeter relays, a contact device associated with the last named relay, said contact device comprising three contacts, a circuit including one of the last named contacts and controlling the directional relay, a circuit including another of the last named contacts and controlling the earth relay, whereby when such last named circuit is closed the current coil of the earth relay is short circuited, a current relay connected in series with the earth relay, a local source of current, a circuit, said circuit including said source, the third of the last named contacts, a contact controlled by the said current relay, a pair of relays operating with time delay, breakers on the lines and each of the last named relays controlling the breakers on one line, and means to close the said last named circuit on the said relays operating with time delay whereby said last relays are operated on the section adjacent the supply source of the distribution network when one line is in service and a simple earth occurs on such section.

14. Selective protecting means for distribution networks with insulated neutral point comprising a directional relay, an earth relay, wattmeter relays individually connected to the distribution phases, a set of three contacts, each contact of this set deflected in both directions and controlled in operation by one of the wattmeter relays, a relay including a winding divided into three equal parts, a source of current and each part of the divided winding energized by said source through one of the said contacts under the control of one of the said wattmeter relays, a contact device associated with the last named relay, said contact device comprising a set of contacts, a circuit including one of the last named contacts and controlling the directional relay, a circuit including another of the last named contacts and the current coil of the earth relay, a current relay connected in series with the current coil of the earth relay, a circuit, said circuit including the said source of current, still another of the last named contacts and means to prevent the operation of the relay with a divided winding when two thirds of said winding are energized, whereby the directional relay is caused to operate when a short circuit appears on the section while a simple earth has occurred on a subsequent section.

15. Selective protecting means for distribution networks with insulated neutral point comprising a directional relay, an earth relay, wattmeter relays individually connected to the distribution phases, a set of three contacts, each contact of this set deflected in both directions and controlled in operation by one of the wattmeter relays, a relay including a winding divided into three equal parts, a source of current and each part of the divided winding energized by said source through one of the said contacts under the control of one of the said wattmeter relays, a contact device associated with the last named relay, said contact device comprising a set of contacts, a circuit, said circuit comprising one contact of the last named set and the current coil of the earth relay, whereby when said circuit is closed the current coil of the earth relay is short circuited, a voltage relay energized by the tension of the neutral point to earth, a current relay connected in series with the current coil of the earth relay, a circuit, said circuit including a source of current, a contact controlled by the said voltage relay, a contact controlled by the said current relay, a pair of relays, a pair of circuit breakers and one contact of the last named set, each of the last named relays controlling one of the breakers, whereby one of the relays of the said pair is energized when the voltage relay is energized, the current relay is unenergized, and one of the breakers is in the position of engagement while the other is disengaged that is when on the section adjacent the supply station one line remains in service and a single earth appears on the section.

ANDRÉ JONNART.